Nov. 15, 1927.

S. D. LAYMAN 1,649,709

LAST BLOCK FASTENER

Filed March 11, 1926

WITNESSES

INVENTOR
Stephen D. Layman,
BY
ATTORNEYS

Patented Nov. 15, 1927.

1,649,709

UNITED STATES PATENT OFFICE.

STEPHEN D. LAYMAN, OF EAST ORANGE, NEW JERSEY, ASSIGNOR OF ONE-HALF TO JOHN H. GORMAN, OF RUTHERFORD, NEW JERSEY.

LAST-BLOCK FASTENER.

Application filed March 11, 1926. Serial No. 93,997.

This invention relates to fastening devices for last blocks and has for an object to provide an improved construction wherein the block may be manipulated in the usual manner while the fastener presents a construction which will not readily wear or injure the block.

Another object of the invention is to provide a fastener for last blocks wherein one of the retaining pins is so held as to be permitted a ready movement when properly manipulated but prevented from injuring the block.

In the accompanying drawing—

Figure 1:
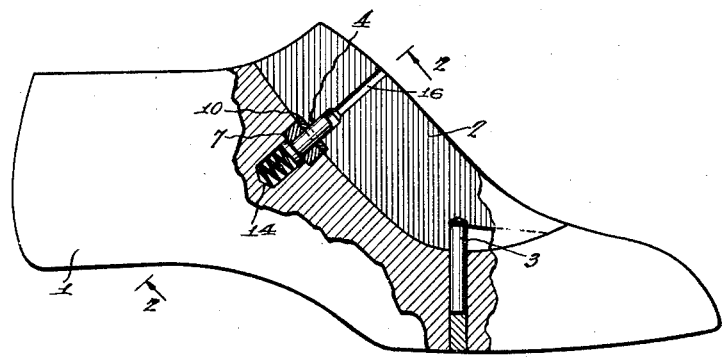
Figure 1 is a side view of a last with certain parts broken away, illustrating the fastener embodying the invention.
Figure 2:
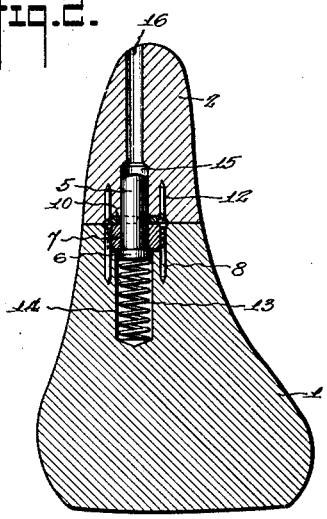
Figure 2 is a sectional view through Figure 1 on line 2—2, the same being on an enlarged scale.
Figure 3:
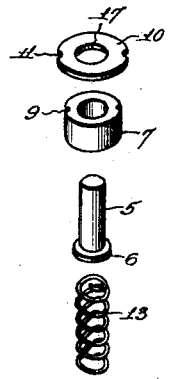
Figure 3 is a view of the fastener with the various parts separated, illustrating their detail construction.

Referring to the accompanying drawing by numerals, 1 indicates the body of the last and 2 the block. Mounted in the body 1 at a convenient point is the front fastening pin 3 and at substantially the usual place in the body 1 is positioned the rear or movable fastener 4. The movable fastener includes a reciprocating pin 5 having a head 6, a guiding sleeve 7 held in place by suitable pins 8 fitted into notches 9 and a guiding and protecting ring 10 having notches 11 receiving the retaining pins 12. Associated with the pin or plunger 5 is a coil spring 13 fitting in the bore 14 formed in the body 1. The block 2 is provided with a bore 15 of a size to permit the pin 5 to easily slide therein but without appreciable loose motion. A restricted passage-way or bore 16 extends from the outer surface of block 2 and merges into bore 15 so that a nail or other instrument may be inserted and the pin 5 depressed against the action of spring 13 when block 2 is to be disengaged.

When block 2 is to be applied, the same is fitted over pin 3 in the usual manner and then pressed downwardly against the pin 5 in the usual manner. This movement will cause the ring 10, which has an appreciable wearing surface, to press against the pin 5 and to press the same until the opening 17 is in line with the pin 5 whereupon the pin will immediately and quickly pass through the opening 17 and into the bore 15 whereupon the block 2 is locked in place. It will be noted that the sleeve 7 is comparatively long and, consequently, provides an easy guide for the pin 5 in its movement. It will be noted that the respective retaining pins 8 and 12 are on opposite sides of the pin 5 rather than above and below the same. In this way the pins 12 are not engaged by the pin 5 when the block is being applied.

What I claim is:

1. The combination with a last and block, of a fastener for the block, said fastener including a sleeve embedded in the last, said sleeve having a plurality of notches, a pin fitted in each of said notches and extending into the last for holding the sleeve in position, a reciprocating pin mounted in said sleeve, a spring acting on the pin for holding the same normally in a given position, and a ring embedded in the block with the aperture in line with the aperture of the sleeve when the block is in operative position, said ring having a plurality of notches, and a retaining pin fitted in each of said notches for locking the ring in place.

2. The combination with a last and block, of a fastener for the block, said fastener including a sleeve wholly embedded in the last and spaced from all of the edges, said last having a bore beneath said sleeve of less diameter than the sleeve, a spring arranged in said bore, a pin slidingly mounted in said sleeve, said pin having an enlarged head pressed by said spring, and a guiding ring wholly embedded in said block for guiding said pin as it enters said block, said ring being spaced from all of the edges, said block having a bore in line with the bore of said ring, said ring and said sleeve each having a pair of notches, and a pin fitted in each of said notches for fastening the ring and sleeve in the block and last respectively.

STEPHEN D. LAYMAN.